Figure 5:
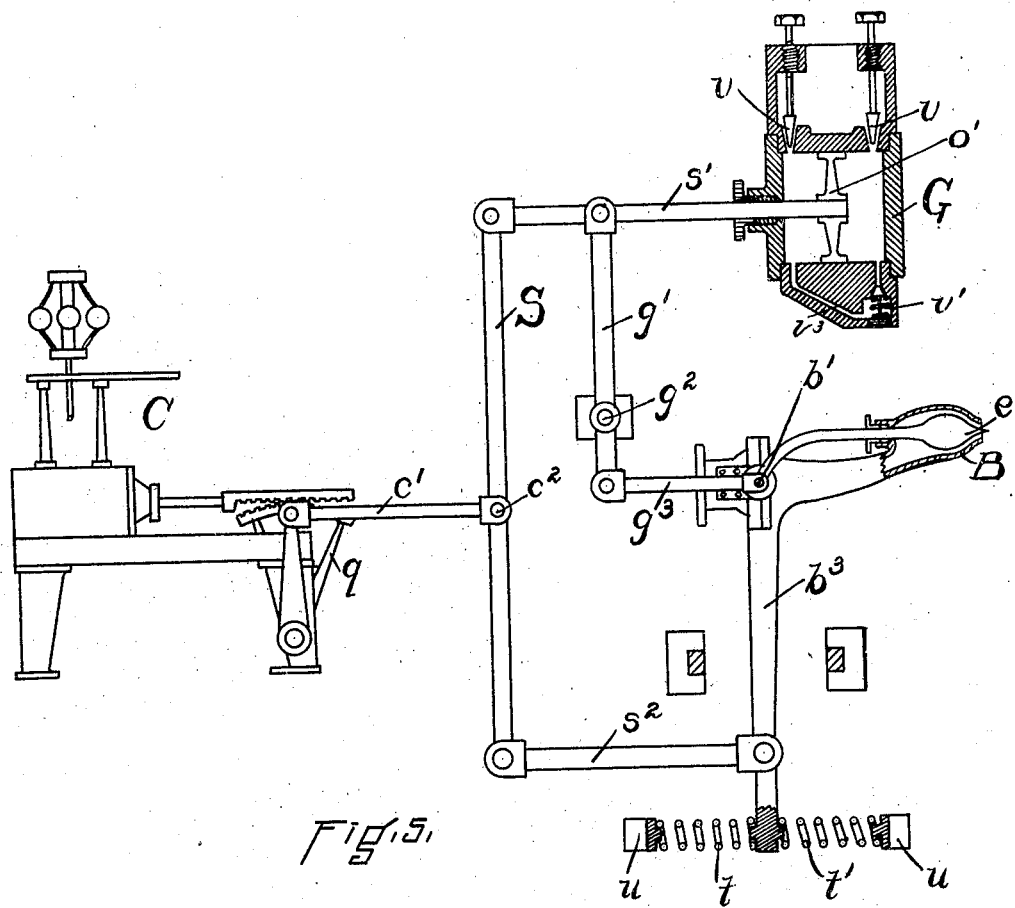

No. 822,030. PATENTED MAY 29, 1906.
H. E. WARREN.
SPEED REGULATING DEVICE FOR WATER WHEELS.
APPLICATION FILED SEPT. 18, 1902.
3 SHEETS—SHEET 1.
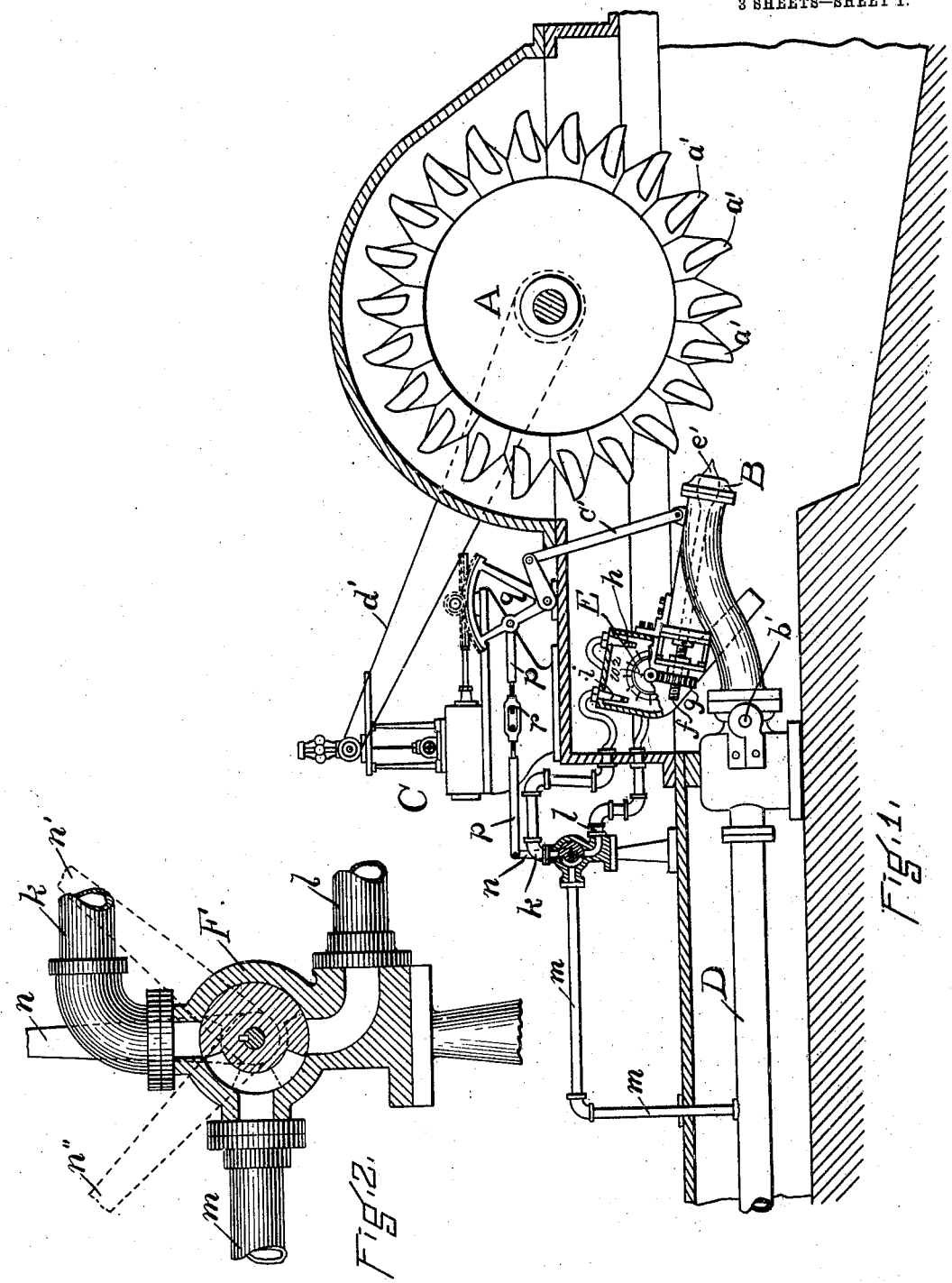
WITNESSES:
R. L. Roberts
E. M. Poole
INVENTOR:
Henry E. Warren

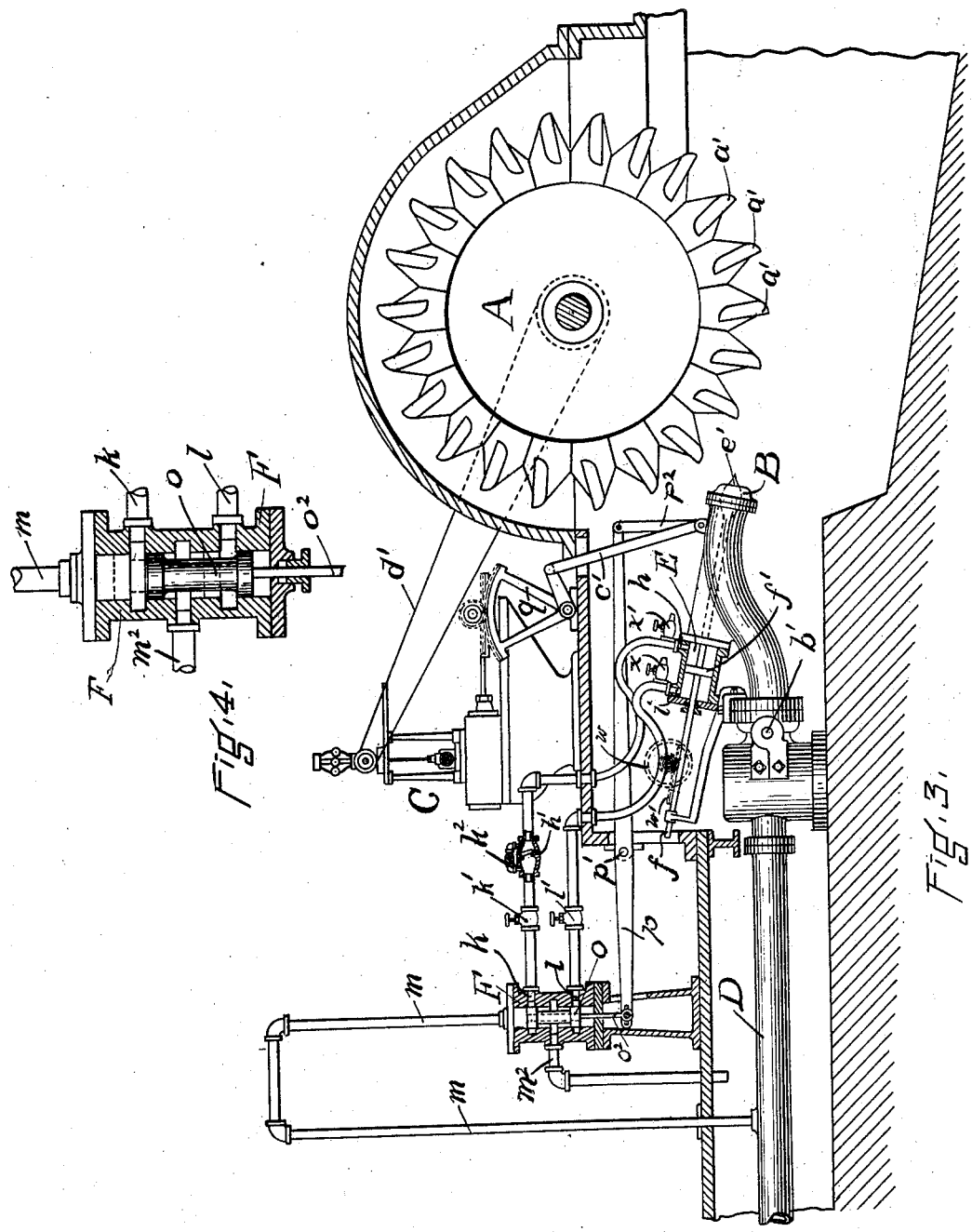

No. 822,030. PATENTED MAY 29, 1906.
H. E. WARREN.
SPEED REGULATING DEVICE FOR WATER WHEELS.
APPLICATION FILED SEPT. 18, 1902.

3 SHEETS—SHEET 3.

WITNESSES:
R. L. Roberts.
E. M. Poole.

INVENTOR-
Henry E. Warren

UNITED STATES PATENT OFFICE.

HENRY E. WARREN, OF NEWTON, MASSACHUSETTS, ASSIGNOR TO THE LOMBARD GOVERNOR COMPANY, OF BOSTON, MASSACHUSETTS, A CORPORATION OF NEW JERSEY.

SPEED-REGULATING DEVICE FOR WATER-WHEELS.

No. 822,030.          Specification of Letters Patent.          Patented May 29, 1906.

Application filed September 18, 1902. Serial No. 123,860.

*To all whom it may concern:*

Be it known that I, HENRY E. WARREN, a citizen of the United States of America, residing at Newton, in the county of Middlesex and State of Massachusetts, have invented certain new and useful Improvements in Speed-Regulating Devices for Water-Wheels, of which the following is a specification.

The improvements relate especially to those types of wheels known as "impact" or "tangential," in which a stream of water flowing at high velocity from a nozzle imparts a portion of its energy to rotate the wheel or cylinder by impact upon its vanes or buckets. Such water-wheels are in general use wherever there is a supply of water under a high head, usually more than fifty feet, and frequently as great as several hundred feet. It is generally necessary in connection with such water-wheels to have a long pipe-line leading from the main water-reservoir to the wheel, and for that reason it has heretofore been found to be impracticable to control the speed of the wheel by a quick-acting valve in the supply-pipe leading to the wheel, so as to reduce or increase the amount of water flowing thereto according to the variations in load upon the wheel. If such a valve were to be used, there would be great danger of bursting the pipe-line, owing to the great inertia of the moving mass of water in the pipe itself, which if suddenly stopped would produce a pressure back of the valve proportional to the velocity of the flow of the water and inversely proportional to the velocity of the closing of the valve. Such a valve could be closed with safety if moved at a slow enough rate; but since the load variations on the wheel are liable to be almost instantaneous it would be wholly impracticable to attempt to close the valve quickly enough to maintain a constant speed of the wheel. Therefore it has been the custom to allow the water to flow from the nozzle at a constant rate and to compensate for changes in load on the water-wheel by deflecting the stream, so that a greater or less amount would strike the buckets and do effective work while the rest would be wasted. This has been accomplished by tilting the nozzle toward or from the buckets, thus changing the angular direction of flow of water. Also it is sometimes effected by a movable shield which deflects a portion of the stream of water flowing therefrom.

By my invention the same control of the speed of the wheel is effected, but with a minimum waste of water. Certain specific forms of devices and appliances which I have found convenient for accomplishing this object are described and set forth in the following description and accompanying drawings, wherein—

Figure 1 represents in side elevation and partly in section one form of the device which I employ to control the flow of water to the water-wheel. Fig. 2 is an enlarged detail of the three-way valve shown in Fig. 1. Fig. 3 is the same as Fig. 1, except that it contains a modification of the small motor and its operating devices by which the flow of water to the water-wheel is regulated. Fig. 4 is an enlarged view of the valve shown in Fig. 3, through which water is supplied to the supplemental motor. Fig. 5 is another form of mechanism which I will designate the "dash-pot control."

Referring to Fig. 1, A represents an impact water-wheel supplied with water under high pressure from the pipe D, through the nozzle B, which is arranged to be tilted about a suitable pivot $b'$, so as to deflect the stream and by changing its direction throw more or less water against the buckets $a'$. C is a governor properly connected, by means of a link $c'$ and other intermediate mechanism hereinafter described, with the nozzle B, and by changing its position the impact of water upon the wheel A may be regulated and its speed controlled. The governor is connected with the wheel A by a belt $d'$. At some point in the pipe-line D, preferably, as shown, at the nozzle B, is an adjustable valve $e'$ to throttle the flow of water through the nozzle. Suitable mechanism, such as a screw $f$ and worm-nut $g$, may be employed to operate the valve $e'$. The nut $g$ is turned by means of a worm $w^2$ on the shaft of a small motor E, (indicated in the drawings as a water-motor,) but a motor driven by steam, electricity, or other motive power may be used. In Fig. 1, E is a small motor mounted on the nozzle B and supplied with water to operate it in one direction or the other through the outlets $i$ and $h$, connected, respectively, by flexible pipes with the ports $k$ and $l$ of the valve F, to which water is conducted from the pipe D through a pipe $m$. The valve F is of the three-way type and is operated by the lever $n$, so as to open communication between pipes $m$ and $k$ when the lever-arm is in the position shown at $n'$ and between $m$ and $l$ when the lever-arm is in the position $n^2$. The lever $n$ is connected by suitable mechanical means, such as the link $p$, bell-crank lever $q$, and link $c'$, with the nozzle B, so that as that nozzle swings up and down upon the pivot $b'$ the lever $n$ will simultaneously turn the valve F and open a passage into the port $k$ and outlet $i$, or the port $l$ and outlet $h$, and direct water onto the motor E, thus causing it to revolve in one or the other direction as the nozzle B oscillates to one side or the other of a certain position, which I shall hereinafter call "normal," in which position the lever $n$ is central, and no water is flowing through either of the outlets $i$ or $h$. The normal position of the nozzle B may be made adjustable by means of a turnbuckle $r$ or similar connection in the link $p$, which connects the valve-lever $n$ with the nozzle B.

In the modified form of devices for operating the valve $e'$ shown in Figs. 3 and 4 the small motor E is of the piston type and is mounted on the nozzle B, the extended stem $f$ of the valve $e'$ serving as the rod for this motor-piston $f'$. As in the form shown in Fig. 1, the cylinder of this motor is supplied with water through flexible pipes $h$ $i$, connected at its respective ends, from a valve F, which in this instance is of the piston type and consists of a cylinder provided with a supply-pipe $m$ and two outlet-pipes $k$ $l$. Within this cylinder is a double-headed piston-valve $o$, provided with a longitudinal opening through it for the passage of water from the upper to the lower end of the cylinder. The rod $o^2$ of the piston $o$ is connected to one end of a lever $p$, which is pivoted at $p'$, and the other end of the lever $p$ is connected with the nozzle B by a link $p^2$. By this means it will be seen that when the nozzle B is deflected downward by an increase in speed of the governor the piston $o$ of the valve F will be moved upward and the port $l$ will be opened, permitting water under pressure to flow to the motor E through the opening $i$ and push the piston therein, with its rod $f$, toward the outlet of the nozzle B, and thereby tend to close the valve $e'$ and diminish the flow of water through the nozzle. The downward movement of the nozzle B deflects a larger amount of water from the buckets of the wheel A, which will decrease its speed, and at the same time through the belt $d'$ decrease the speed of the revolving balls of the governor C, which, as with the previously-described mechanism, will cause the nozzle B to move toward the wheel A until it assumes its normal position again. The return of the nozzle B will, through the connections with the lever $p$, return the piston-valve $o$ to a central position in its cylinder, and thereby close both ports $k$ and $l$; but the valve $e'$ will remain in the new position to which it was moved by the operation of the motor E, and thus produce a discharge from the nozzle proportioned to the changed load on the water-wheel A. A movement upward of the nozzle B, due to a decrease in speed of the governor, caused by an increase of load on the wheel A, will draw the piston $o$ of the valve F downward, open the port $k$, and permit water under pressure to flow through the pipe $h$ to the forward end of the motor E and push back the piston therein, which will tend to open the valve $e'$. The piston-valve $o$ is so constructed that when one of the ports $k$ or $l$ is open for the flow of water under pressure the other is open to the waste or discharge pipe $m^2$, and by this arrangement when water under pressure is admitted upon one side of the piston in the moter E—for instance, through the pipe $i$—the water upon the other side of the piston will be discharged through the pipe $h$ and into the valve F through the port $k$ and out of the pipe $m^2$. Under these conditions the operation of the motor E tends to close the valve $e'$, and as it is desirable that this operation should be very slow a check-valve $h'$ is placed in the pipe $h$ and an adjustable by-pass $h^2$ around the check-valve is provided, so that the speed of the discharge of water from the motor E through the pipe $h$ may be regulated as desired. When, however, water under pressure is conducted to the motor E through the pipe $h$, the check-valve offers no obstruction, and the water flows freely to the forward end of the motor and is as freely discharged from the other end of the pipe $i$, so that the valve $e'$ may be quickly opened. For the purpose of regulating the amount of flow of water through the pipes $i$ and $h$ throttle-valves $l'$ and $k'$ may be placed therein. As it may be desirable at some times to operate the valve $e'$ by hand, I provide a wheel $w$, on the shaft of which is a pinion which engages a rack $w'$ upon the rod $f$. At such times the motor-cylinder E should be relieved from the water resistance, which may be accomplished by opening escape-valves $x$ $x'$ in the pipes $i$ and $h$ and closing the valves $l'$ $k'$.

In the modified form of devices for operating the valve $e'$ shown in Fig. 5 and which I call the "dash-pot control" the link $c'$, which is connected at one end with the governor-operated crank $q$, is connected at the other end with a floating lever S at the point $c^2$. One end of the lever S is pivoted to a rod $s'$, which extends out from a piston $o'$ within a dash-pot G. The other end of the lever S is connected by a link $s^2$ with an arm $b^3$, projecting from the nozzle B, and through these connections $c'$ S $s^2$ $b^3$ the nozzle B is caused to rock upon its fulcrum-point $b'$. The outer end of the arm $b^3$ is held normally in a central position between two posts $u$ $u$ by strong opposing springs $t$ $t'$ secured thereto, and when the arm $b^3$ is in this central position the nozzle will occupy what I have termed its "normal" position. A lever $g'$, fulcrumed at $g^2$, is pivoted at one end to the piston-rod $s'$ and at the other end to a link $g^3$, which link is attached to the stem of the valve $e'$. It will be seen, therefore, that any movement of the piston $o'$ in the dash-pot G will, through the rod $s'$, lever $g'$, and link $g^3$, cause a movement of the valve $e'$ within the nozzle B. The dash-pot G is filled with liquid, the speed of movement of which from one side to the other of the piston $o'$ is regulated by valves $v$, and to permit the piston $o'$ to move quickly in the direction to open the valve $e'$ a check-valve $v'$ may be placed in a passage $v^3$, which connects the two ends of the piston-chamber in the dash-pot G. This dash-pot construction is employed in place of the small motor E (shown in Fig. 1) to give a slow movement of the valve $e'$ when it is necessary to change the volume of water flowing from the nozzle B, and as the point $c^2$ of the lever S occupies a different position in relation to the fulcrum $b'$ of the nozzle B for each change in the speed relation between the water-wheel A and the governor C the relative position of the valve $e$ and the opening in the nozzle B will be correspondingly different when the nozzle has resumed its normal position, and the volume of water which then flows through the nozzle will vary accordingly and be in proportion to the load on the water-wheel.

In practical use the operation of my improvements may be explained as follows: Referring, for example, to the construction shown in Fig. 1, assume, first, that the velocity of the wheel A is normal and the nozzle B is standing in its normal position. When in this position, the direction of the stream flowing therefrom should be such that its entire volume will not quite completely strike the buckets $a'$ of the wheel A; otherwise there would be no opportunity to produce an increase. Under these normal conditions the balls of the governor C will be running at a constant speed and the mechanism operated thereby will be stationary, as will also the motor E, and the position of the valve $e'$ will be such as to allow just the necessary amount of water to flow through the nozzle B to produce the normal speed. Now let a decrease in the load carried by the wheel A occur. The speed of the wheel A will instantly begin to increase and the resulting increased speed of the governor C will immediately move the nozzle B so as to deflect the jet of water flowing through it away from the buckets $a'$. At the same time this movement of the nozzle B will cause a movement of the lever $n$ and open the valve F so as to allow water to flow through it from the pipe $m$ to the port $k$ and thence from the outlet $i$ against the buckets upon one side of the motor E, causing it to rotate to the left and by means of the worm $w^2$ and the nut $g$ to begin slowly to close the valve $e'$. As the valve $e'$ continues to close the flow of water through the nozzle B will gradually diminish and the speed of the wheel A will have a tendency to fall below the normal, and would do so, except for the fact that the governor C will, by its action, due to this decrease in speed of the wheel A, bring the nozzle B gradually back again into its normal position, when the discharge-varying means will cease to act and there will be no further change in the position of the valve $e'$, for the reason that the three-way valve F will have been closed. The valve $e'$ will, however, be in a different position from that which it occupied before the load change occurred, and the discharge will be proportioned to such change. For an increase of load and a consequent temporary decrease in speed of the wheel A the nozzle B will be moved by the governor C toward that wheel, thus throwing against the buckets $a'$ that portion of the stream of water which was passing just outside of these buckets when the nozzle B was in its normal position. This increased amount of water will assist in keeping up the speed of the wheel A. At the same time the valve F will allow water to flow through the outlet $h$ against the motor E upon the other side thereof, thereby gradually opening the valve $e'$ and instantly throwing a sufficiently large stream of water against the buckets $a'$ of the wheel A to increase its speed and also that of the governor, which will gradually bring the nozzle B back to its normal position again and also stop the action of the motor E upon the valve $e'$. The operation of the devices shown in Fig. 3 is the same excepting that the supplemental motor is of the hydraulic cylinder and piston type, which will be understood from the previous description thereof. The operation of the devices shown in Fig. 5 accomplishes the same result—that is, the first action of the governor due to a change of speed is to act directly upon the nozzle to deflect it in one direction or the other, and by that operation, instead of starting a supplemental motor to act upon the nozzle-valve, one of the springs $t$ $t'$ is put under tension to furnish the motive power, and then, as that spring under the restraint of the dash-pot slowly returns the nozzle to its normal position the valve within that nozzle will, through the interconnecting levers described, enlarge or contract the water-delivery opening and regulate the flow to meet the varying conditions of load on the motor. The relative amount of movement of the valve $e'$ may be regulated by adjustment of the fulcrum-point $g^2$ in relation to the ends of the lever $g'$. An analysis of these actions of my improvements will show that the governing of the speed of a water-wheel is carried out through two stages of operations, in the first of which the governor, through its connection with the tilting nozzle or other deflecting device, maintains the speed of the wheel substantially constant by instantaneously throwing a greater or less portion of the stream of water upon the buckets of the wheel, while in the second stage there is a gradual adjustment of a valve to increase or decrease the amount of water flowing through the nozzle to correspond with the requirements of the load upon the water-wheel when the nozzle is in a position to give nearly the maximum efficiency of the stream of water flowing through it. The character of the load upon the water-wheel in which the sudden fluctuations are likely to occur will determine the normal position of the nozzle, which should be arranged to throw as nearly as possible the entire volume of its stream upon the buckets of the wheel and still have a sufficient portion of the stream normally thrown outside of these buckets to be brought into action to meet any sudden increase in load which might require temporarily the full volume of the stream upon the buckets. The speed of movement which may be given to the valve $e'$ by its actuating-motor will depend upon the conditions at the plant where the device is installed. If the pipe-line leading to the nozzle is extremely long and conducts water from a great height, it will be necessary to have the valve $e'$ move very slowly in its throttling action, while if the pipe-line is comparatively short the valve $e'$ can safely be moved with much greater speed.

Having explained the operation of several forms of construction embodying my invention, it will be seen that the purpose of the improvement is to effect the accurate speed-regulation of an impulse water-wheel with the highest possible efficiency in the use of water, and at the same time with economy, by cutting off as rapidly as possible consistent with safety to the supply-pipe the portion of the water which is serving no useful purpose.

I claim—

1. In combination with a water-wheel, a water-supply pipe, automatically-operated means to change the direction of flow of water from the pipe against the wheel, a valve to regulate the flow of water from the pipe and interconnecting mechanism between the said flow-changing means and the valve, which tends to move the valve whenever the flow-changing means are out of their predetermined normal positions.

2. In combination with a water-wheel, a water-supply pipe, automatically-operated means to change the direction of flow of water from the pipe against the wheel, a valve to regulate the flow of water from the pipe, mechanism to operate the valve, which mechanism is controlled by said direction-changing means, and a speed-governor which primarily operates said means.

3. In combination with a water-wheel, a water-supply pipe, means for automatically turning a portion of the water flowing from the pipe, away from or toward the wheel, a valve to regulate the flow of water from the pipe, a speed-governor, and interconnecting operating mechanism between the governor and the automatic turning means, and the said valve.

4. In combination with a water-wheel, a water-supply pipe, means to deflect the water flowing therefrom, a speed-governor, mechanism which connects the governor and the water-deflector, a valve to regulate the flow of water from the supply-pipe, and an automatically-controlled motor which tends to close the valve by the action of the mechanism which moves the deflecting means from their normal position to decrease the impact of water upon the wheel, and to open the valve by the action of the mechanism which moves the deflecting means from their normal position to increase the impact of water upon the wheel.

5. In combination with a water-wheel; a tilting supply-nozzle; mechanism to tilt the nozzle automatically either away from or toward the wheel whenever it changes in speed; a valve to regulate the flow of water from the nozzle, and valve-operating mechanism which is controlled by the mechanism that tilts the nozzle.

6. In combination with a water-wheel, a tilting supply-nozzle; a speed-governor; mechanism actuated by the governor which is connected with and tilts the nozzle; a valve to regulate the flow of water from the nozzle, and means to operate the valve which means are controlled by the tilting mechanism of the nozzle.

7. In combination with a water-wheel; a tilting supply-nozzle; interconnecting mechanism between the water-wheel and the nozzle to tilt the latter either away from or toward the wheel whenever it changes in speed; a valve to regulate the flow of water from the nozzle; a motor which is controlled by the nozzle-tilting mechanism to close the valve when the nozzle is moved from its normal position away from the wheel and to open the valve when the nozzle is moved from its normal position toward the wheel.

8. In combination with a pivoted nozzle of the character described, means for adjusting the nozzle upon its pivot, mechanism carried by the nozzle, to regulate the cross-sectional area of its discharge and which is free to be operated irrespective of the position of the nozzle, and automatic means for operating said mechanism.

9. In combination with a water-wheel nozzle, primary means to give it approximate adjustments to vary the direction of the stream discharged therefrom, secondary means upon the nozzle, to regulate the cross-sectional area of said stream to correspond substantially with the portion which strikes the wheel after an approximate adjustment of the nozzle, and mechanism to automatically adjust said secondary means.

10. In combination with a single discharge-nozzle for a water-wheel, means to adjust the nozzle in relation to the water-wheel, mechanism which is carried by the nozzle and is free to move therewith, to regulate the cross-sectional area of the stream discharged therefrom, and which is adapted to be operated irrespective of the position of the nozzle, and means to automatically operate said regulating mechanism.

11. In combination with a single discharge-nozzle for a water-wheel, primary means to give approximate adjustments of the nozzle to vary the direction of the stream discharged therefrom, in relation to the water-wheel, secondary means upon the nozzle to regulate the cross-sectional area of the stream to correspond with that which strikes the wheel after any approximate adjustment of the nozzle, and mechanism to automatically operate said secondary means.

12. In combination with a supply-nozzle for a water-wheel, means to move the nozzle to direct the stream issuing therefrom, wholly or in part against the buckets of the wheel, or outside of the buckets, devices within the nozzle to regulate the amount of water flowing therefrom, and means to automatically adjust said devices.

13. In hydraulic regulating means, the combination with the hydraulic motor, of a pivoted nozzle, means for automatically adjusting said nozzle on its pivot, means for regulating the cross-sectional area of the discharge-opening of the nozzle to vary the discharge proportionately to the working load of the motor, and devices for automatically operating the means which vary the cross-sectional area of the nozzle's discharge.

14. The combination with a hydraulic motor of the described character, of governor mechanism, a pivoted nozzle, means actuated by the governor mechanism for automatically adjusting said nozzle on its pivot, means for varying the cross-sectional area of the discharge-opening of the nozzle to vary the amount discharged therefrom proportionately to the working load of the motor, and devices controlled by the governor mechanism for actuating the means for varying the outlet area of the nozzle.

15. The combination with a hydraulic motor, of governor mechanism, a nozzle for the discharge of an impact or propelling stream onto the motor, means actuated by the governor mechanism for varying the direction of the discharged stream, means for varying the discharge from the nozzle proportionately to the working load of the motor, and devices controlled by the governor mechanism for operating the means for varying the discharge from the nozzle.

16. The combination with a hydraulic motor, of governor mechanism, a nozzle for the discharge of an impact-stream, devices operated by the governor for varying the direction of the impact-stream and associated devices controlled by said governor mechanism for varying the discharge of the stream from the nozzle proportionately to the working load of the motor.

17. The combination with a hydraulic motor, of governor mechanism, a nozzle for the discharge of an impact-stream, devices actuated by the governor mechanism for varying the direction of the nozzle's discharge, and associated devices controlled by said governor mechanism for varying the cross-sectional area of discharge proportionately to the working load of the motor, said devices comprising means for actuating the same with a more rapid movement during the increase of the outlet area of the nozzle than the movement imparted thereto during the decrease of said outlet area.

18. The combination with a hydraulic motor, of governor mechanism, a nozzle for the discharge of an impact-stream to operate the motor, means actuated by the governor mechanism to vary the direction of the nozzle's discharge in accordance with the working load of the motor, and means actuated by the pressure of the water-supply for adjusting the cross-sectional area of discharge from the nozzle, to correspond with the amount of water which strikes the motor at each changed direction or position of the stream discharged.

19. The combination with the line or supply-pipe for a water-wheel, a discharge-nozzle movably connected thereto, means for raising and lowering the nozzle in accordance with the load variations on the wheel, and means to automatically vary the outlet area for the stream ejected from the nozzle to meet the requirements of the load changes.

20. In combination with a water-wheel nozzle, means for raising or lowering it proportionately to the load variations on the wheel, and means for automatically varying the area of the stream discharged in accordance with the changes in position of the nozzle due to said load variations.

21. In combination with a deflectable water-wheel nozzle, means for varying the position thereof in accordance with load variations on the wheel, a longitudinally-movable plug located within the nozzle, and means for automatically moving the plug in or out to change the outlet area for the stream to correspond with the variations in position of the nozzle.

22. In combination with a water-wheel nozzle, means for varying the direction of the stream ejected therefrom, to meet the requirements of the load variations on the wheel, and means whereby the outlet area for the stream is automatically varied to compensate for such load changes.

23. A water-wheel nozzle provided with means for adjusting the position thereof in relation to the wheel, combined with means whereby the discharge from the nozzle may be regulated automatically while the nozzle is in any of its adjusted positions and without interference with such adjustment.

24. The combination with a hydraulic motor, of a tilting nozzle for the discharge of an impact-stream, governor mechanism to operate the nozzle, means controlled by the said mechanism for varying the discharge of the nozzle proportionately to the working load of the motor, and means operated through the movement of the nozzle to cause said discharge-varying means to cease to act when the nozzle-discharge has been proportioned to the working load of the motor.

25. The combination with a hydraulic motor, of governor mechanism, a nozzle for the discharge of an impact or propelling stream upon the motor, means actuated by the governor mechanism for varying the direction of the stream discharged, automatically-operated means for varying the nozzle-discharge proportionately to the working load of the motor, which means are controlled by the mechanism which varies the direction of the stream, to cause said discharge-varying means to cease action when the nozzle-discharge has assumed its normal direction and has been proportioned to the working load of the motor.

26. In combination with a pivoted water-wheel nozzle adapted to move in a vertical plane, means for automatically adjusting the nozzle on its pivot, mechanism carried by the nozzle and free to move therewith for regulating the cross-sectional area of the discharge therefrom, and automatic means for operating the regulating mechanism when the nozzle is tilted.

27. In a hydraulic nozzle for a water-wheel, mechanism for automatically regulating the amount of water discharged therefrom, combined with mechanism for directing the nozzle's discharge toward or deflecting it from the wheel.

28. In a hydraulic nozzle for a water-wheel, mechanism for automatically regulating the amount of water discharged therefrom combined with automatically-operated mechanism for directing the nozzle-outlet toward or deflecting it from the wheel.

HENRY E. WARREN.

Witnesses:
REUBEN L. ROBERTS,
EDITH M. POOLE.